(12) United States Patent
Hall, Jr. et al.

(10) Patent No.: US 7,668,163 B2
(45) Date of Patent: Feb. 23, 2010

(54) TRANSPARENT NETWORK SERVICE ENHANCEMENT

(75) Inventors: Michael Lee Hall, Jr., Austin, TX (US); Mukund Trimbak Ingle, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 249 days.

(21) Appl. No.: 11/948,351

(22) Filed: Nov. 30, 2007

(65) Prior Publication Data

US 2009/0141722 A1 Jun. 4, 2009

(51) Int. Cl.
*H04L 12/28* (2006.01)
(52) U.S. Cl. .................. 370/389; 370/400; 709/238
(58) Field of Classification Search ........................ None
See application file for complete search history.

(56) References Cited

U.S. PATENT DOCUMENTS 7,200,673 B1 * 4/2007 Augart ....................... 709/238

2005/0021999 A1 * 1/2005 Touitou et al. ............... 713/200
2006/0230134 A1 * 10/2006 Qian et al. ................... 709/224

* cited by examiner

*Primary Examiner*—Bob A Phunkulh
(74) *Attorney, Agent, or Firm*—Patterson & Sheridan, LLP

(57) ABSTRACT

Embodiments of the invention may be used to optimize communications between a first routing device and a second routing device. The first routing device may receive a packet for forwarding towards a destination. The first routing device may modify the packet to announce the presence of the first routing device to other routing devices. Thereafter, a second routing device may receive the modified packet and recognize the presence of the first routing device. In turn, when sending a packet back towards a source address identified in the modified packet, the second routing device may modify such a packet to announce the presence of the second routing device to the first routing device. Thereafter, the first and second routing device may optimize traffic between the first and second routing device.

24 Claims, 9 Drawing Sheets

TRANSPARENT NETWORK SERVICE ENHANCEMENT

BACKGROUND OF THE INVENTION

1. Field of the Invention

Embodiments of the invention generally relate to network traffic management. More specifically, embodiments of the invention are related to allowing transparent network service enhancement among wide-area application services.

2. Description of the Related Art

Network traffic management techniques have been developed that enhance performance of TCP based applications by applying various compression algorithms to data traffic between two routing devices on a network. The enhanced services such as data compression and data acceleration are provided within the same network stream established between two endpoints, instead of through tunnels or other data streams. This transparent data transfer technique allows for the network traffic to be monitored with normal networking tools.

In some cases, a first routing device between the two endpoints may compress traffic in between the first routing device and a second routing device. Further, the routing devices may alter packet sequence numbers. Once the traffic reaches the second routing device, the data packets may be decompressed and given the original sequence number.

Problems arise when a state tracking firewall, or intrusion prevention system (IPS) is interspersed somewhere within the traffic flow between the two endpoints. State tracking firewalls and IPS may drop TCP packets with modified sequence numbers. This prevents the compressed data packets from reaching a destination. On the other hand, if a routing device used to decompress data packets fails while using original sequence numbers, the endpoint may try to process the compressed data packets as if they were uncompressed, leading to data corruption.

Accordingly, what is needed is a technique for providing enhanced traffic services to traverse each section even when there is a state tracking firewall.

SUMMARY OF THE INVENTION

Embodiments of the invention may be used to optimize communications between a first routing device and a second routing device. The first routing device may receive a packet for forwarding towards a destination. The first routing device may modify the packet to announce the presence of the first routing device to other routing devices. Thereafter, a second routing device may receive the modified packet and recognize the presence of the first routing device. In turn, when sending a packet back towards a source address identified in the modified packet, the second routing device may modify such a packet to announce the presence of the second routing device to the first routing device. Thereafter, the first and second routing device may optimize traffic between the first and second routing device.

One embodiment of the invention includes a method that may generally include receiving, at a first routing device, a first packet containing a first time-to-live (TTL) value in a header field of the packet, recording the TTL value in a second header field of the packet, and forwarding the packet towards a destination. The method may also include receiving the packet at a second routing device, calculating a first delta TTL value from the TTL value in the first and second header fields of the packet. The first delta TTL represents a hop distance from the first routing device to the second routing device. The method may also include receiving, at the second routing device, a second packet containing a second TTL value in a first header field of the second packet, recording the second TTL value in a second header field of the second packet, forwarding the second packet towards a destination, and receiving the second packet at the first routing device. The method may also include calculating a second delta TTL value from the TTL value in the first and second header fields of the second packet. The second delta TTL represents a hop distance from the second routing device to the first routing device.

Once the delta TTL values have been exchanged, the first and second routing device may optimize traffic between the first and second routing device. For example, in a particular embodiment, the method may further include receiving, at the first routing device, a third packet containing a third TTL value in a header field of the third packet. In response the first routing device may replace the third TTL value in the third packet with the first delta TTL value, compress a data payload of the third packet, and forward the third packet towards the second routing device.

Once the third packet is received by the second routing device, that routing device may decompress the data payload of the third packet, replace the first delta TTL value in the third packet with the third TTL value, and forward the third packet towards the destination.

Advantageously, as network traffic between the first and second routing device may be optimized without modifying to a packet sequence number (e.g., in a TCP header structure) compressed traffic may pass through a state tracking firewall or intrusion prevention system (IPS) without being dropped. Further, by modifying the TTL value in this way, should one of the first or second routing devices fail, packets with optimized (e.g., compressed) traffic do not inadvertently reach a destination.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention may be used to optimize communications between a first routing device and a second routing device. The first routing device may receive a packet for forwarding towards a destination. The first routing device may modify the packet to announce the presence of the first routing device to other routing devices. Thereafter, a second routing device may receive the modified packet and recognize the presence of the first routing device. In turn, when sending a packet back towards a source address identified in the modified packet, the second routing device may modify such a packet to announce the presence of the second routing device to the first routing device. Thereafter, the first and second routing device may optimize traffic between the first and second routing device.

For example, the routing devices may compress data payloads in packets sent between them. In such a case, the first and second routing devices may be configured to transmit data packets transparently through a network, after portions of a given packet have been compressed by the first routing device, but at the same time, prevent data packets carrying compressed data from reaching a final destination unless the packets have passed through the second routing device, where the data packet is decompressed. Further, because embodiments of the invention do not rely on modifications to a packet sequence number (e.g., in a TCP header structure) compressed traffic may pass through a state tracking firewall or intrusion prevention system (IPS) without being dropped. In one embodiment, a "time to live" TTL value encoded in the header of a given packet may be modified to a hop distance between the first and second routing device. By modifying the TTL value in this way, should one of the first or second routing devices fail, packets with optimized traffic do not inadvertently reach a destination.

Figure 1:
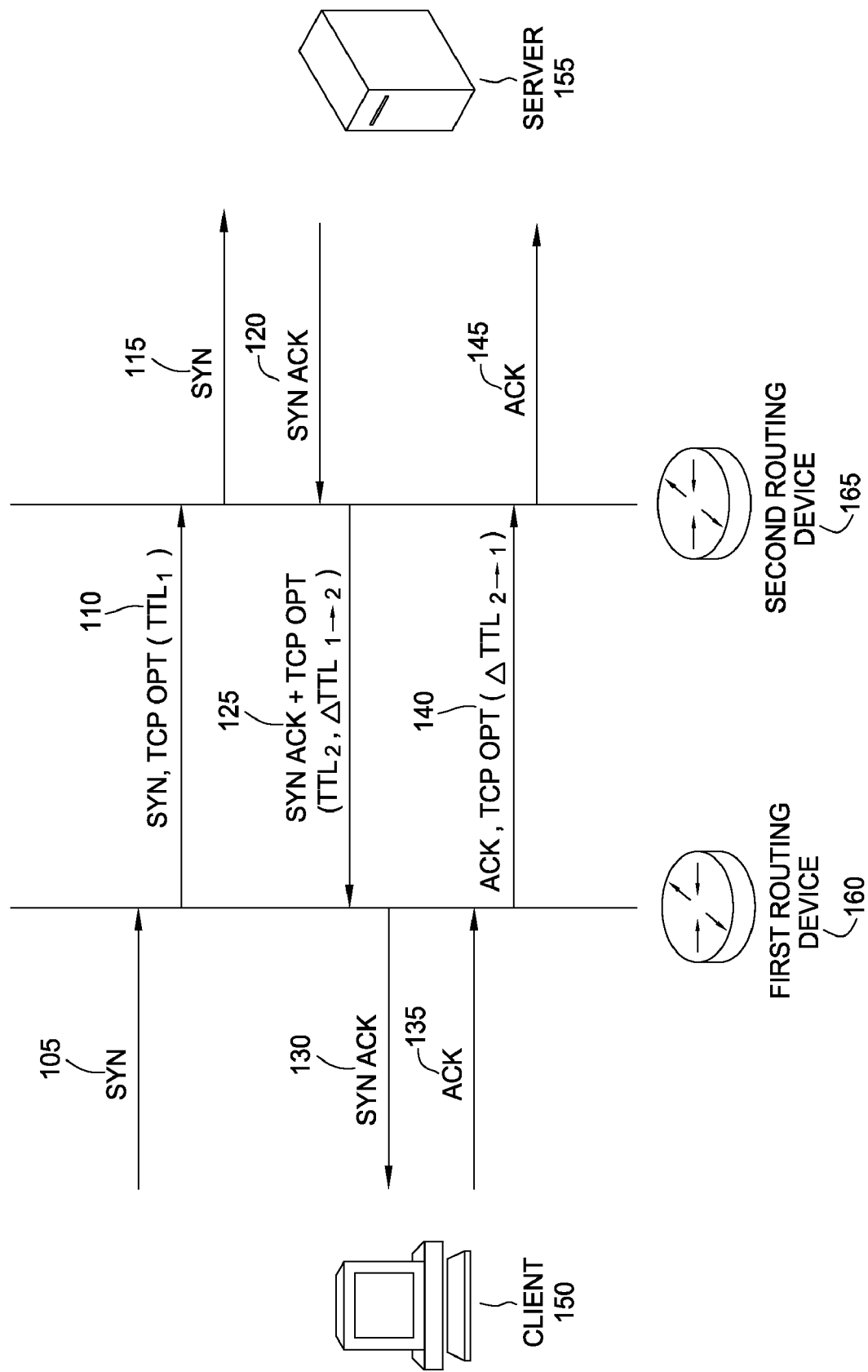
FIG. 1 is a timing diagram of a "handshake" used to initialize communications between a client and a server, according to one embodiment of the invention.

FIG. 1 is a timing diagram 100 of a "handshake" used to initialize communications between a client 150 and a server 155, according to one embodiment of the invention. In this example, client 150 and server 155 initialize a TCP session. Additionally, FIG. 1 illustrates an auto-discovery process between a first routing device 160 and a second routing device 165 that effectively piggybacks on the handshake process between client 150 and server 155.

In one embodiment, the first routing device 160 and second routing device 165 determine the minimum number of hops necessary to reach one from the other, in both directions. As is known, the TTL is a value that is decremented at each hop a packet makes before reaching its destination. If the TTL reaches zero before the packet reaches its destination, that packet is discarded. The first routing device 160 and second routing device 165 may determine the minimum TTL value necessary to reach each other during an initial auto discovery process. This is part of a "three-way handshake" as shown in timing diagram 100, which initializes a TCP session between client 150 and server 155 and allows routing devices 160 and 165 to discover each other.

As shown in FIG. 1, at step 105, the client 150 sends a synchronization (SYN) packet across a wide area network (WAN) toward the server 155. Illustratively, the packet is transmitted from the client to routing device 160, to routing devices 165, and then to server 155. Communications from the server 155 to the client 150 may follow the same path, in reverse. When the SYN packet reaches the first routing device 160, the first routing device 160 notes the current TTL found in the IP header of the packet and may modify the TCP header to reflect this value. For example, the first routing device stores this value in the TCP option fields of the TCP header. Additionally, the first routing device 160 may include information regarding the capabilities of device 160, e.g., what compression algorithms it may use to optimize data communications in the TCP option fields. At step 110, the first routing device 160 forwards the SYN packet (along with the modified TCP header) towards its destination. When the SYN packet reaches the second routing device 165, that routing device becomes aware of the first routing device 160, based on the modified TCP option fields. The second routing device 165 may use the then current TTL value found in the IP header of the packet, as well as the TTL value noted by the first routing device 160 to calculate a delta TTL from the first routing device 160 to the second routing device 165. That is, the second routing device calculates the number of hops the SYN packet traveled from the first routing device 160 to reach the second routing device 165. Thus, the delta TTL value is the minimum required value for a packet to travel from the first routing device 160 to the second routing device 165 without reaching zero and being discarded. At step 115, the second routing device 165 forwards the SYN packet towards the server 155.

At step 120, the server 155 then sends an acknowledgment and synchronization (SYN ACK) packet toward the client 150. When the SYN ACK packet reaches the second routing device 165, that device notes the current TTL found in the IP header of the SYN ACK packet and may modify the TCP header to reflect this value, e.g., in the TCP option fields. At step 125, the SYN ACK packet is forwarded towards the client 150. When the SYN ACK packet reaches routing device 160, the SYN ACK packet includes the delta TTL between the first routing device 160 and the second routing device 165, and the TTL at the second routing device 165. When the first routing device 160 receives the SYN ACK packet, that routing device may determine a delta TTL from the second routing device 165 to the first routing device 160. That is, the first routing device 165 calculates the number of hops the SYN ACK packet traveled from the second routing device 160 to reach the first routing device 165. Thus, the first routing device 160 may now calculate the delta TTL as the difference between the TTL reflected in the TPC options field and the current TTL of the SYN ACK packet found in the IP header. Accordingly, the first routing device 160 is aware of the minimum TTL necessary for a packet to travel between the two routing devices 160 and 165. At step 130, the first routing device 160 forwards the SYN ACK packet towards the client 150.

After the client receives the SYN ACK packet, it may respond by forwarding an acknowledgment (ACK) packet towards the server 155. When the ACK packet is intercepted by the first routing device 160, that routing device is already aware of the existence of the second routing device and the delta TTL between the two routing devices in each direction. At step 140, the packet continues and is received by the second routing device 165. The second routing device 165 becomes aware of the delta TTL from the second routing device 165 to the first routing device 160 which has been noted in the TPC Options field. Now both routing devices 160 and 165 are aware of each other and are aware of the minimum TTL for a packet to travel between them in each direction. At step 145, second routing device forwards the ACK packet towards the server 155, completing the "three way handshake."

Figure 2:
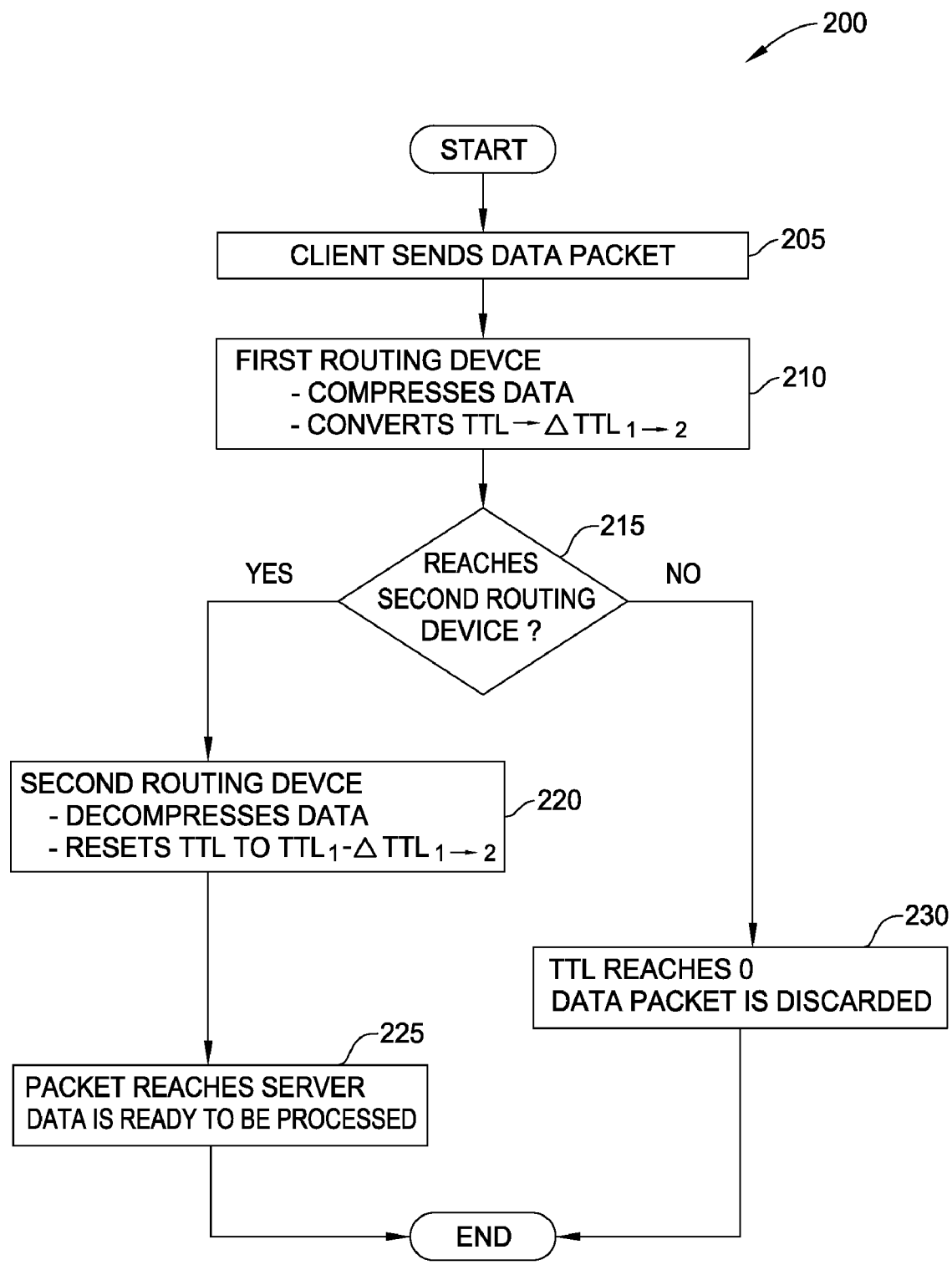
FIG. 2 is a flow diagram illustrating a method for routing data in a data communications network, according to one embodiment of the invention.

FIG. 2 is a flow diagram illustrating a method for routing data in a data communications network, according to one embodiment of the invention. More specifically, FIG. 2 illustrates a method 200 for the first routing devices 160 and the second routing device 165 to optimize data communications between client 150 and server 155. In this example, assume that client 150 and server 155 have initialized a TCP session using the modified handshake technique shown in FIG. 1. At step 205, client 150 sends a data packet towards server 155. At step 210, the first routing device 160 may compress the data packet and modify the TTL in the IP header to the delta TTL from the first routing device 160 to the second routing device 165. As described above, the first routing device 160 calculates a minimum TTL value needed for the packet to reach the second routing device 160 from the first routing device 160.

After being modified, the first routing device forwards the compressed packet towards the second routing device 165. If the packet successfully reaches the second routing device 165, as shown at step 220, that routing device decompresses the data and resets the TTL to what it would have been had the first routing device 160 not altered the TTL. The TTL at step 220 may be calculated by subtracting the delta TTL (representing the number of hops between the first routing device 160 and the second routing device 165) from the TTL at the first routing device 160. The second routing device forwards the packet toward the server 155. At step 225, the packet reaches the server 155, and data in the packet may be processed by the server as normal. Alternatively, if the packet does not reach the second routing device (e.g., in the event the second routing device 165 fails) the TTL is decremented to zero, and the data packet is discarded before reaching the server 160, with valid headers, but compressed data.

Further, in one embodiment, the first routing device 160 may subsequently determine that the second routing 165 device has failed. For example, because the packet sent at step 205 does not reach the server 155, obviously, the server 155 does not send a TCP acknowledgement for this packet. Thus, client 155 may eventually initiate a TCP resend of this packet. In the event that the first routing device 160 receives a packet with a TCP resend of a packet that the first routing device 160 had compressed and forwarded towards second routing device 165, then the first routing device 160 may be configured to assume that the second routing device has failed and stop compressing data packets.

Although described in terms of a packet being sent from client 150 to server 155, one of ordinary skill in the art will readily recognize that packets sent in the other direction (i.e., from server 155 to client 150) may be processed in a similar manner. Namely, to compress data packets and to modify a TTL value to the minimum value needed for the packet to travel from the second routing device to the first routing device 160, toward the client 150.

FIGS. 3-9 illustrate data communications between the client 150 and server 155, according to one embodiment of the invention. In this example, assume that client 150 and server 155 have initialized a TCP session using the modified handshake technique shown in FIG. 1.

Figure 3:
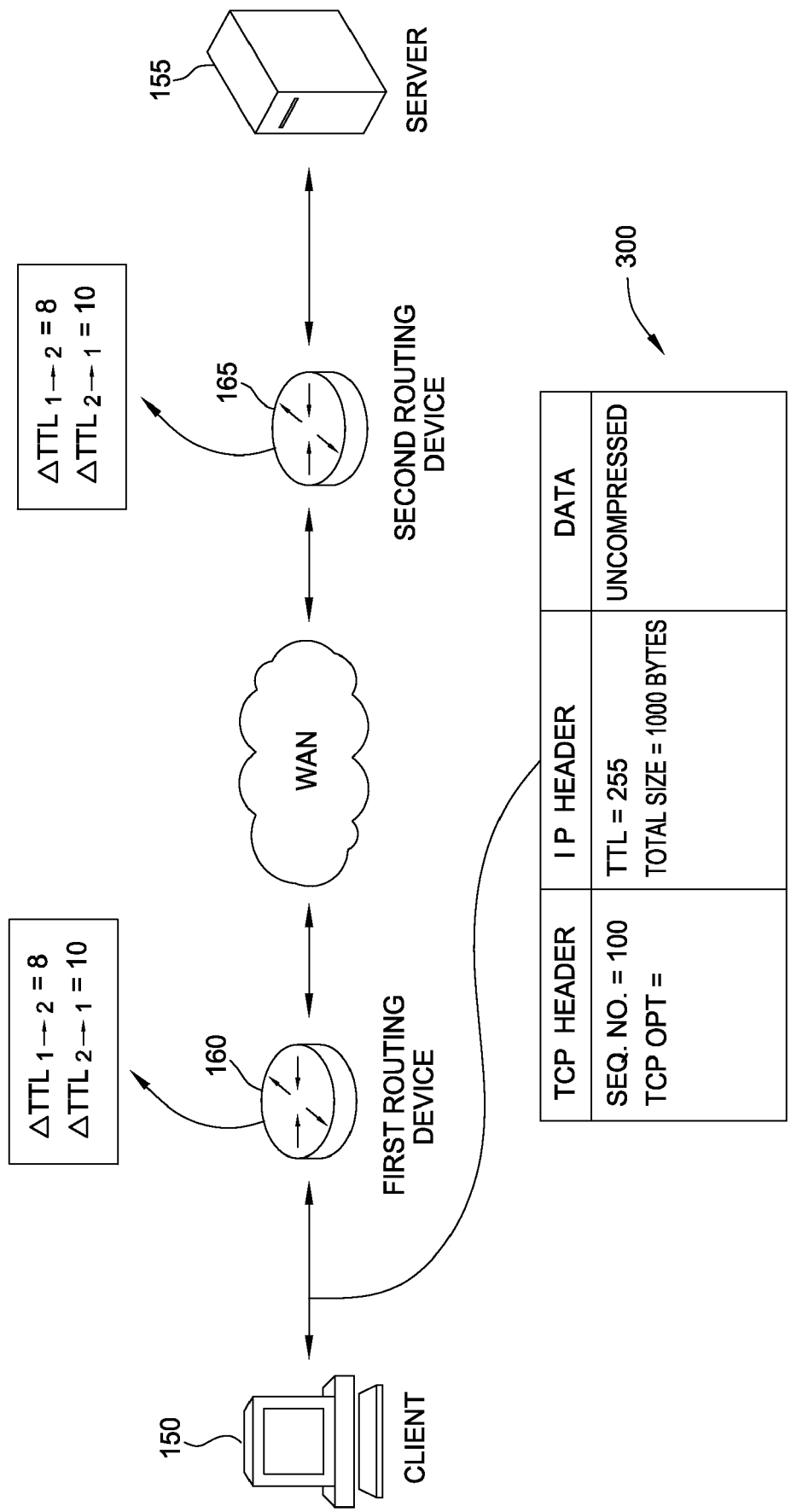
FIG. 3 illustrates an example embodiment of a network trafficking technique at an initial state, where a data packet sent to a server from a client.
Figure 4:
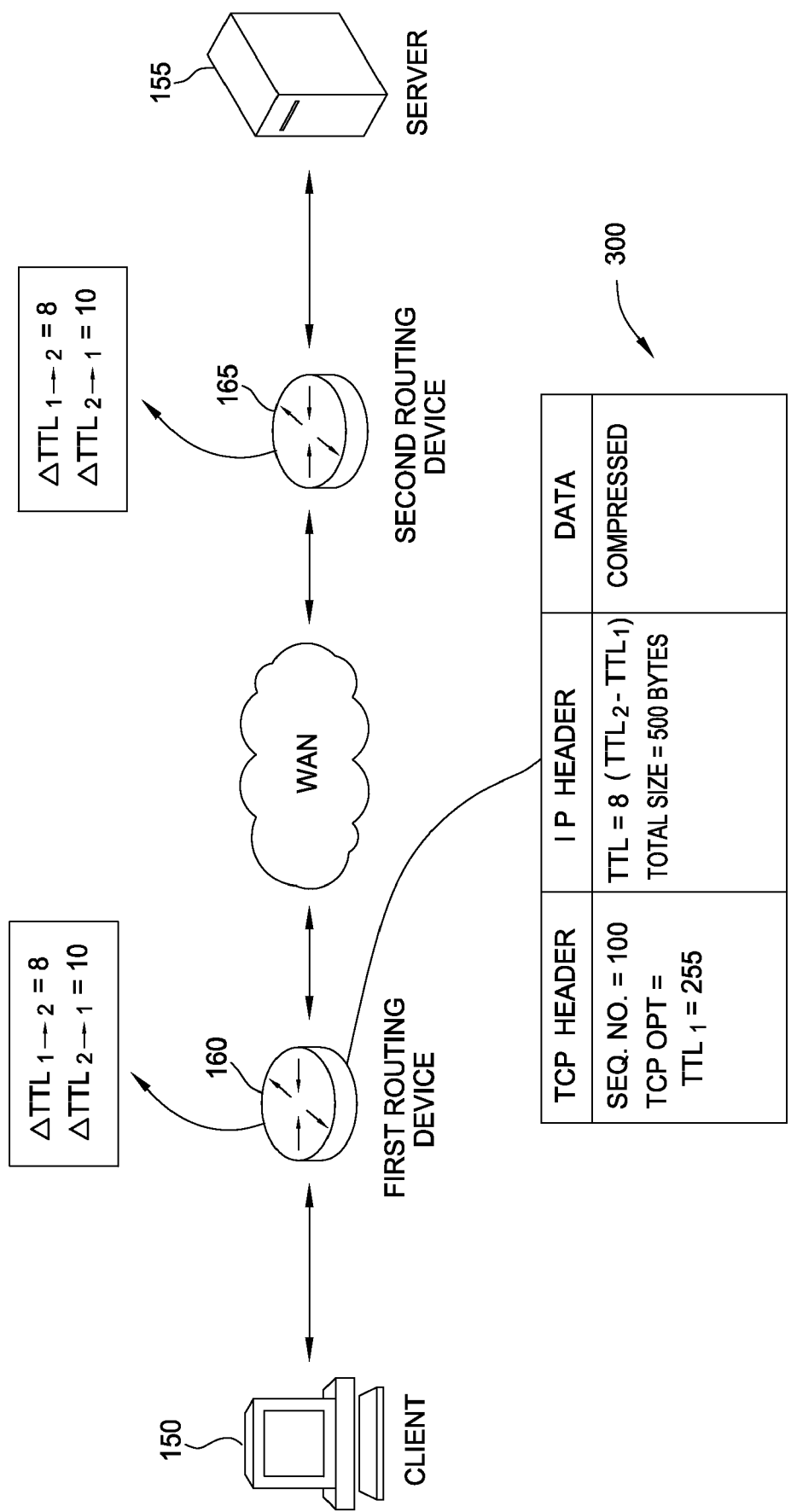
FIG. 4 illustrates an example embodiment of the network trafficking technique as the data packet is routed from a first routing device to a second routing device.

FIG. 3 illustrates an example of a packet 300 after being sent from the client 150. In this example, the packet 300 includes an original sequence number of 100, a TTL of 255, and a total data size of 1000 bytes. Additionally, as transmitted by the client 150, the data is uncompressed. FIG. 4 shows the data packet 300 reaching the first routing device 160. The first routing device 160 makes note of the current TTL value in the TCP Option fields and modifies the TTL value to the delta TTL value between the first routing device 160 and the second routing device 165. As described, the first routing device determined this value during the auto discovery process outlined in FIG. 1. In this example, the first routing device 160 makes note in the TCP Option fields that the TTL is 255 and the first routing device 160 modifies the TTL to 8, which would be the delta TTL that the first routing device 160 determined during the auto discovery process. In one embodiment, the first routing device 160 compresses the data packet 300 and modifies the total length to the new shortened length. In this case, the new total length is 500 bytes after the data has been compressed.

Figure 5:
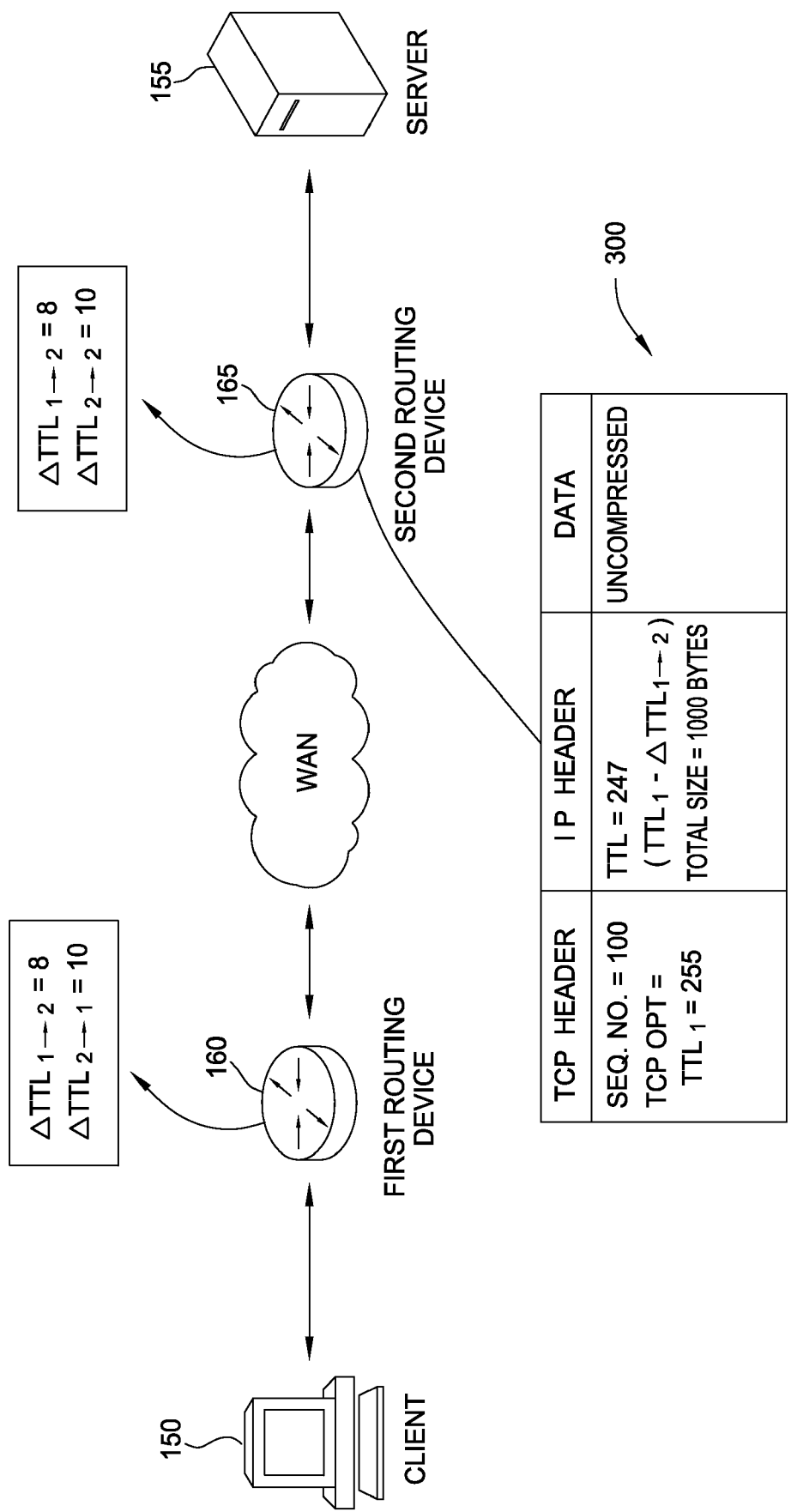
FIG. 5 illustrates an example embodiment of the network trafficking technique after the data packet successfully reaches the second routing device, and is forwarded to the server.

FIG. 5 shows packet 300 after it has successfully passed through the second routing device 165. The second routing device 165 replaces the TTL with the original TTL value that would have been present had packet 300 not been modified by the first routing device 160. In one embodiment, the second router 165 may determine the correct TTL value by subtracting the delta TTL that the second routing device determined during the auto discovery process, from the TTL at the first routing device 160, which is currently noted in the TCP Option fields. In this example, the TTL at the first routing device was 255 and the delta TTL from the first to second routing device is 8, so the second routing device 165 would reset the TTL value to 247. Additionally, the second routing device 165 may decompress the data and modify the total length value accordingly. In this example, the data in packet 300 has been decompressed and the total length is reset to 1000. This allows the second routing device 165 to forward the data packet 300 towards server 165 in the original form as sent by client 150.

Figure 6:
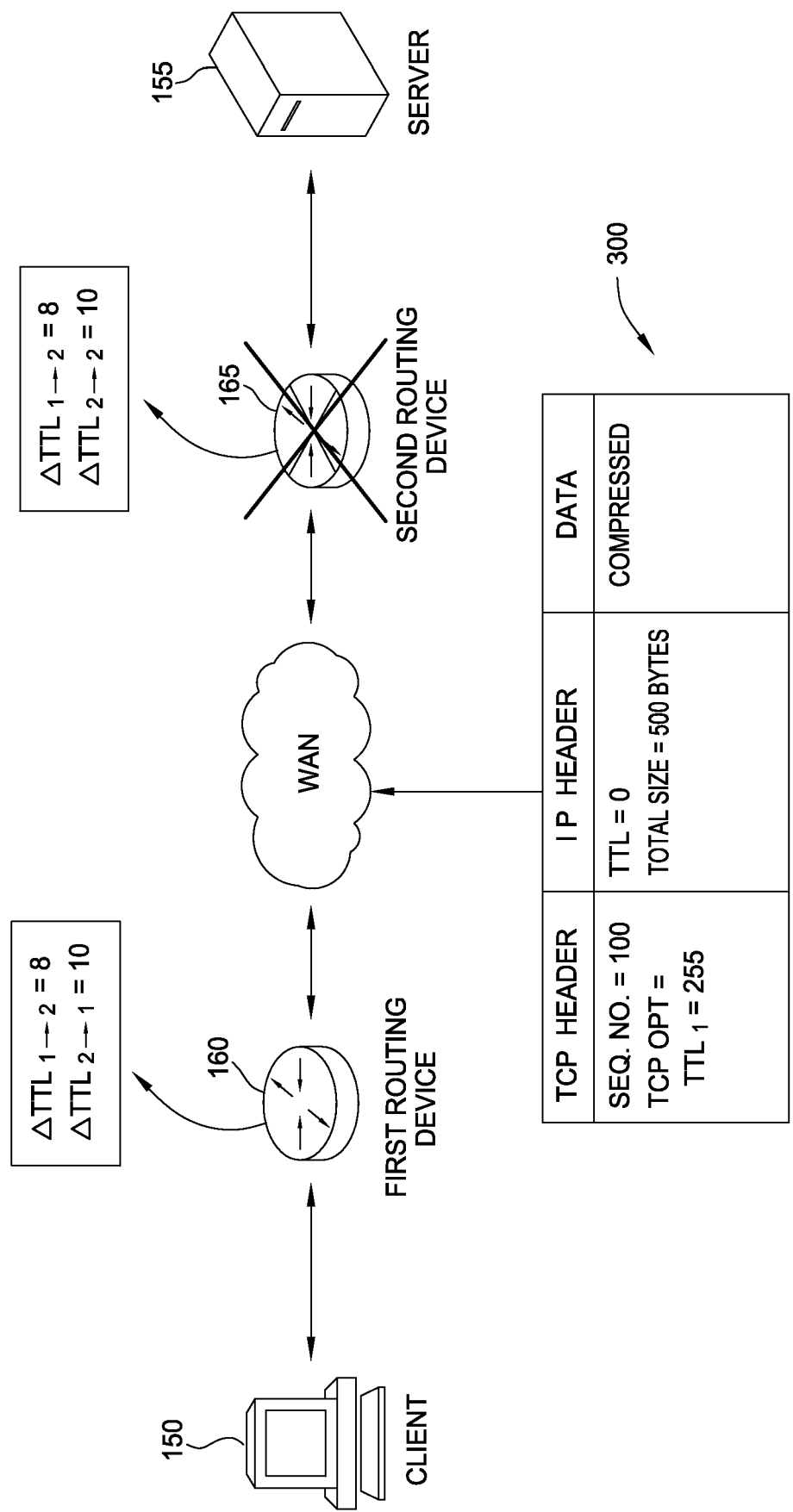
FIG. 6 illustrates an example embodiment of the network trafficking technique where the data packet is unable to reach the second routing device after being altered by the first routing device.

FIG. 6 illustrates an example of what may happen when data packet 300 is unsuccessful in reaching the server 155, after passing through the first routing device 160. This may occur, for example, if the second routing device 165 fails. In such a case, the total length would remain smaller and the data would remain compressed, however, the packet is syntactically correct, and if packet 300 were to reach server 155, it would be processed as being valid. Because the data payload is compressed, it would disrupt data processing on the server. However, because the TTL value was set to the minimum distance between the first routing device 160 and the second routing device 165, the TTL of the packet 300 reaches zero prior to reaching server 155. For example, the data packet 300 may be discarded by a routing device along an alternate route traversed by this packet to bypass the second routing device 165. Thus, server 155 may be prevented from receiving the compressed data packet 300 and attempting to process it as uncompressed data.

Figure 7:
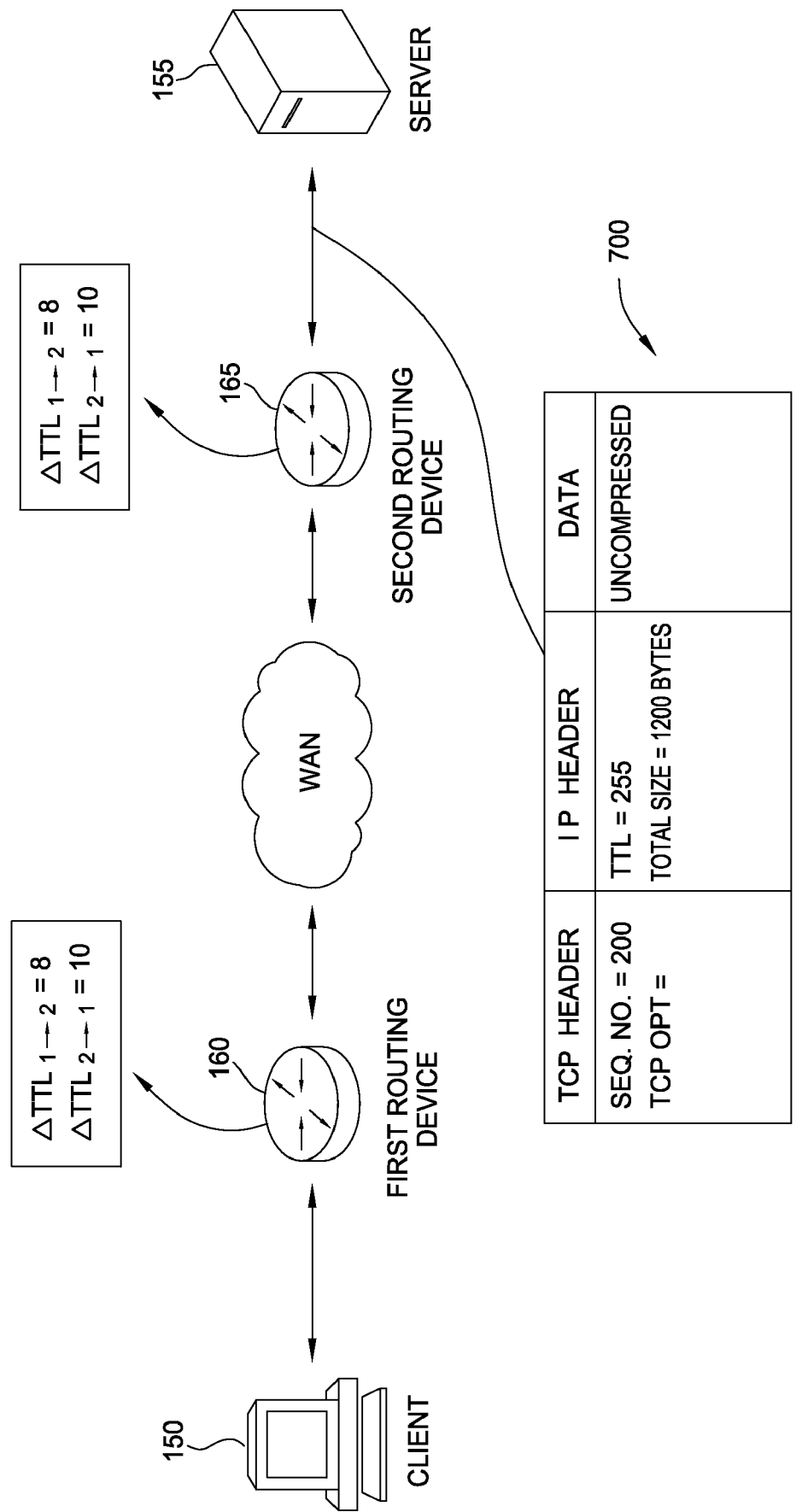
FIG. 7 illustrates an example embodiment of the network trafficking technique, where a data packet is initially sent from a server to a client.
Figure 8:
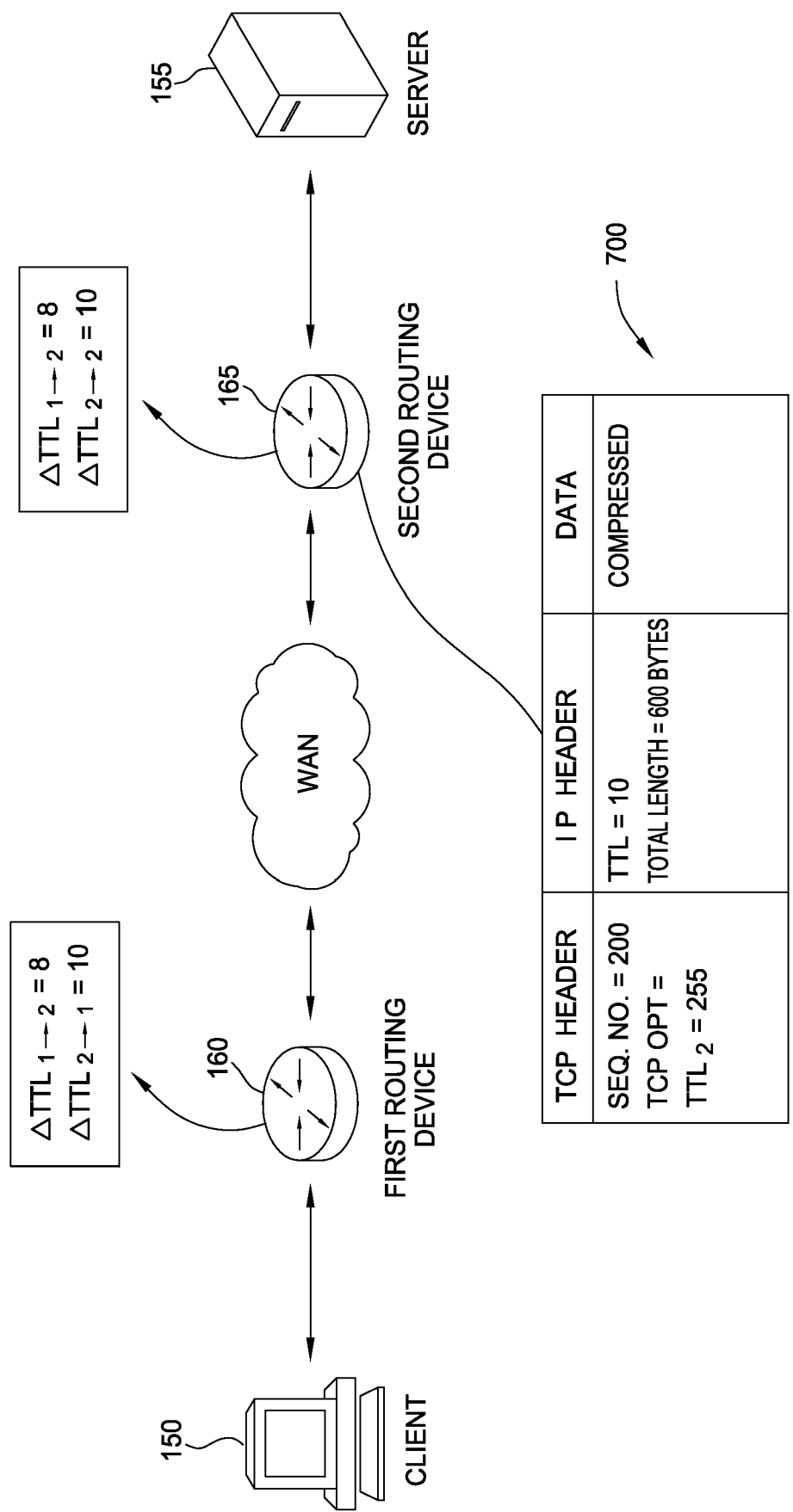
FIG. 8 illustrates an example embodiment of the network trafficking technique, where the data packet is altered by the second routing device and is forwarded toward the first routing device.
Figure 9:
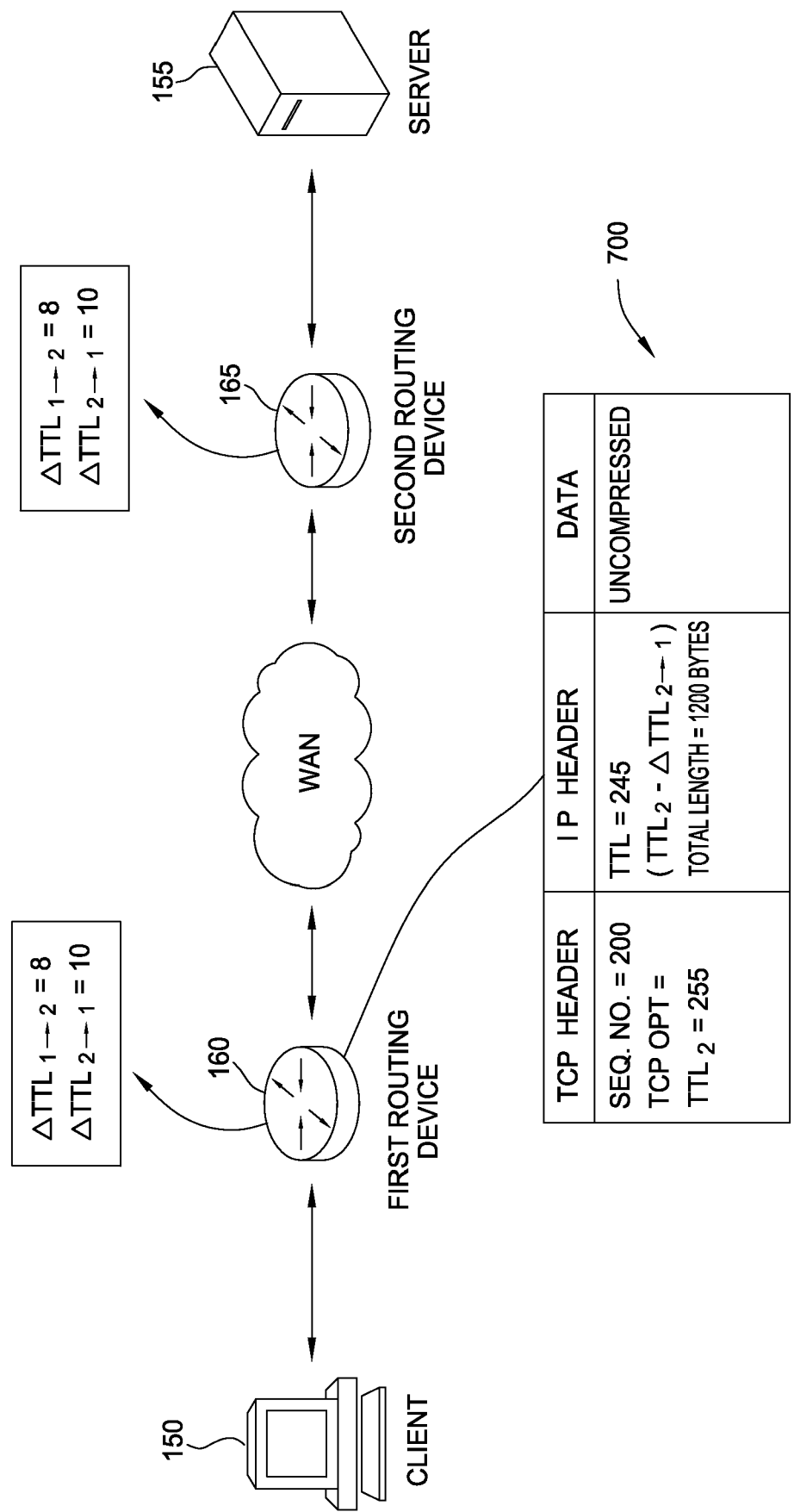
FIG. 9 illustrates an example embodiment of the trafficking technique after a data packet is altered by a first routing device and is forwarded toward a client.

Just as compressed data may be sent across a wide area network from a client to a server, the server 155 may send data packets back to the client 150 using the compression technique without risk of the client 150 receiving and attempting to process the compressed data. FIGS. 7, 8 and 9 illustrate an example of a data packet being sent from a server 155 to a client 150, according to one embodiment of the invention. FIG. 7 shows a packet 700 that includes a sequence number of 200, a TTL of 255, and a total length of 1200 being forwarded by server 155 towards client 150. FIG. 8 shows packet 700 after being received by the second routing device 165. As described above, the second routing device 165 may be configured to record a current TTL value in the TCP option fields. The TTL value is modified to the delta TTL from the second routing device 165 to the first routing device 160, which the second routing 165 determined during the auto discovery process illustrated in FIG. 1. Additionally, the second routing device 165 compresses the data in the packet and modifies the total length accordingly. In this example, the total length is modified to 600.

FIG. 9 illustrates data packet 700 after it leaves the first routing device 165. As shown, the first routing device 165 has decompressed the contents of packet 300 and modified the total length accordingly. In this example, the value of the total length is returned to 1200. Additionally, the TTL value is restored to the values in the packet as sent by server 155. Like the process described above in FIGS. 3-6, this may be calculated by subtracting the delta TTL representing the number of hops between the second routing device and the first routing device from the TTL noted at the second routing device. In this example, the TTL becomes 245. When the data packet 700 reaches the client 150, the client 150 may process the uncompressed data.

As described above, the TTL vales are exchanged between the first and second routing device when the TCP connection is first established. However, in one embodiment, the TTL values may be recalibrated at some point after the initial three-way TCP handshake. For example, a copy of the first packet containing the first TTL value may again be sent to the second router. In such a case the second router may calculate a first delta TTL value from the TTL value in the first and second header fields of the packet, verify the accuracy of the first delta TTL value and recalibrate if necessary. This process may be repeated in the other direction by receiving, at the first routing device, a second packet containing a second TTL value in a first header field of the second packet, recording the second TTL value in a second header field of the second packet, forwarding the second packet towards a destination, and receiving the second packet at the first routing device. In such a case, a second delta TTL value from the TTL value may be calculated from the first and second header fields of the second packet, verifying the accuracy of the second delta TTL value, and recalibrating the delta TTL values as necessary.

In some cases, network paths might change between the first routing device and the second routing device. In such cases, in addition to recalibrating the delta TTL value, it may be beneficial to add additional room to the TTL field used between the two routers, i.e., by increasing the TTL value to allow for a few extra hops. For example, if a customer or end user is aware that an endpoint server is 5 or more hops from the second router, it may be desirable to allow the customer to set the TTL equal to the first delta TTL plus a value less than 5, such as 3. The additional headroom value may be entered by the end user as a global for the device or for each destination IP address. In response to receiving a SYN packet, the second router may identify a destination IP address, find the headroom value, and communicate that back to the first router during the SYN ACK part of the three way handshake. However, if the initial user is aware that the servers being optimized are or more hops away from the first router, it may be desirable to allow the initial user to add an additional headroom value. In this case, the additional headroom value may be communicated in the SYN or ACK of the exchange.

Additionally, it is important to note that to optimize performance the modifications to the TTL need only occur when there is an overlap between the real client's sequence number window and the compressed data's sequence number space. When the real client's sequence number window and the compressed data's sequence number space do not overlap the end host will not process the compressed data since the sequence number will not be in the window.

While the foregoing is directed to embodiments of the present invention, other and further embodiments of the invention may be devised without departing from the basic scope thereof, and the scope thereof is determined by the claims that follow.

We claim:

1. A method, comprising:
    receiving, at a first routing device, a first packet containing a first time-to-live (TTL) value in a header field of the first packet;
    recording the first TTL value in a second header field of the first packet;
    forwarding the first packet towards a destination;
    receiving the first packet at a second routing device;
    calculating a first delta TTL value from the first TTL value in the first and second header fields of the packet, wherein the first delta TTL represents a hop distance from the first routing device to the second routing device;
    receiving, at the second routing device, a second packet containing a second TTL value in a first header field of the second packet;
    recording the second TTL value in a second header field of the second packet;
    forwarding the second packet towards a destination;
    receiving the second packet at the first routing device; and
    calculating a second delta TTL value from the TTL value in the first and second header fields of the second packet, wherein the second delta TTL represents a hop distance from the second routing device to the first routing device.

2. The method of claim 1, further comprising:
    receiving, at the first routing device, a third packet containing a third TTL value in a header field of the third packet;
    replacing the third TTL value in the third packet with the first delta TTL value;
    compressing a data payload of the third packet; and
    forwarding the third packet towards the second routing device.

3. The method of claim 2, further comprising:
    receiving, at the second routing device, the third packet;
    decompressing the data payload of the third packet;
    replacing the TTL value in the third packet with the third TTL value less the hop distance from the first routing device to the second routing device; and
    forwarding the third packet towards the destination.

4. The method of claim 1, wherein the first packet is a TCP SYN packet.

5. The method of claim 1, wherein the second packet is a TCP SYN ACK packet.

6. The method of claim 1, wherein the first header of the packet is an IP header.

7. The method of claim 1, wherein the second header field of the packet is a TCP header including TCP option fields.

8. A system, comprising:
    a first routing device comprising:
        a processor;
        a networking interface; and
        a memory containing instructions for a routing program, wherein the routing program is configured to:
            receive a first packet containing a first time-to-live (TTL) value in a first header field of the first packet,
            record the first TTL value in a second header field of the first packet, forward the first packet towards a second routing device, and receive, from the second routing device, a second packet wherein the second packet includes a first delta TTL value calculated from the first TTL value in the first and second header fields of the first packet, and wherein the first delta TTL represents a hop distance from the first routing device to the second routing device.

9. The system of claim 8, wherein the routing program is further configured to:

receive a third packet containing a third TTL value in a header field of the third packet;

replace the third TTL value in the third packet with the first delta TTL value;

compress a data payload of the third packet; and forward the third packet towards the second routing device.

10. The system of claim 8, wherein the first packet is a TCP SYN packet.

11. The system of claim 8, wherein the second packet is a TCP SYN ACK packet.

12. The system of claim 8, wherein the first header of the packet is an IP header.

13. The system of claim 8, wherein the second header field of the packet is a TCP header including TCP option fields.

14. A system, comprising:

a second routing device comprising:

a processor;

a networking interface; and a memory containing instructions for a routing program, wherein the routing program is configured to:

receive a first packet forwarded from a first routing device, wherein the first packet includes a first time-to-live (TTL) value in a first and second header fields of the first packet, calculate a first delta TTL value from the first and second header fields of the first packet, wherein the first delta TTL represents a hop distance from the first routing device to the second routing device, receive a second packet, record the first delta TTL value in a header field of the second packet, and forward the second packet towards the first routing device.

15. The system of claim 14, wherein the routing program is further configured to:

receive a third packet from the first routing device, wherein the third packet includes a compressed data payload and a TTL value;

decompress a data payload of the third packet;

replace the TTL value in the third packet with a third TTL value calculated from the first TTL value less the first delta TTL value; and forward the third packet towards a destination.

16. The system of claim 14, wherein the first delta TTL value is calculated from the TTL value in the first header field of the first packet and a value recorded in a second header field of the first packet storing a TTL value of the packet at the first routing device.

17. The system of claim 14, wherein the first packet is a TCP SYN packet.

18. The system of claim 14, wherein the second packet is a TCP SYN ACK packet.

19. The system of claim 14, wherein the first header of the packet is an IP header.

20. The system of claim 14 wherein the second header field of the packet is a TCP header including TCP option fields.

21. A method comprising:

receiving, at a first routing device, a packet from a client with a time-to-live (TTL) value;

modifying the packet at the first routing device by compressing a data payload of the packet and updating a total length value of the packet and replacing the TTL value with the a delta TTL value representing a hop distance from the first routing device to a second routing device;

forwarding the packet towards the second routing device;

receiving the packet at the second routing device;

modifying the packet at the second routing device by decompressing the data payload of the packet and updating the total length value of the packet;

determining an unmodified TTL value for the packet by subtracting the delta TTL value from the TTL value as received by the first routing device;

replacing the TTL value with the unmodified TTL value less the hop distance from the first routing device to the second routing device; and forwarding the packet from the second routing device towards a destination.

22. The method of claim 21, wherein the method further comprises recalibrating the delta TTL value.

23. The method of claim 21, wherein the recalibrating comprises:

recalculating the hop distance from the first routing device to the second routing device; and updating the delta TTL value based on the recalculation.

24. The method of claim 21, wherein an additional headroom value is added to the delta TTL value.

* * * * *